(12) United States Patent
Ghosh et al.

(10) Patent No.: US 12,340,682 B2
(45) Date of Patent: *Jun. 24, 2025

(54) ENHANCED ACCESSIBILITY USING WEARABLE COMPUTING DEVICES

(71) Applicant: Wells Fargo Bank, N.A., San Francisco, CA (US)

(72) Inventors: Debashis Ghosh, Charlotte, NC (US); Carrie Anne Hanson, Charlotte, NC (US); Elizabeth S. Votaw, Potomac, MD (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/604,948

(22) Filed: Mar. 14, 2024

(65) Prior Publication Data
US 2024/0221476 A1 Jul. 4, 2024

Related U.S. Application Data

(63) Continuation of application No. 18/120,572, filed on Mar. 13, 2023, now Pat. No. 11,961,389, which is a continuation of application No. 17/247,145, filed on Dec. 1, 2020, now Pat. No. 11,605,271.

(51) Int. Cl.
*H04B 3/36* (2006.01)
*G08B 6/00* (2006.01)
*H04B 1/3827* (2015.01)

(52) U.S. Cl.
CPC ............... *G08B 6/00* (2013.01); *H04B 1/385* (2013.01)

(58) Field of Classification Search
CPC .......... G08B 6/00; G06F 3/013; G06F 3/016; B60K 2370/1434; B60K 2370/149; B60K 2370/152; B60K 2370/1533; B60K 2370/157; B60K 2370/158; B60K 2370/164; B60K 2370/194; B60K 2370/21; B60K 2370/67; B60K 37/06; B60K 35/00; H04B 1/385
See application file for complete search history.

(56) References Cited

U.S. PATENT DOCUMENTS

| | | |
|---|---|---|
| 6,413,229 B1 | 7/2002 | Kramer et al. |
| 9,477,313 B2 | 10/2016 | Mistry et al. |
| 9,569,756 B1 | 2/2017 | Bueche, Jr. et al. |
| 9,612,661 B2 | 4/2017 | Wagner et al. |
| 9,613,505 B2 | 4/2017 | Martinson et al. |
| 9,720,515 B2 | 8/2017 | Wagner et al. |
| 9,741,215 B2 | 8/2017 | Brav et al. |

(Continued)

OTHER PUBLICATIONS

"U.S. Appl. No. 17/247,145, Non Final Office Action mailed Jun. 8, 2022".

(Continued)

*Primary Examiner* — Toan N Pham
(74) *Attorney, Agent, or Firm* — SCHWEGMAN LUNDBERG & WOESSNER, P.A.

(57) ABSTRACT

Disclosed in some examples are methods, systems, devices, and machine-readable mediums which provide a wearable device, such as a smart ring, that provides feedback to guide users in performing physical tasks. Tasks may include tasks associated with an application executing on a mobile device of the user.

20 Claims, 6 Drawing Sheets

(56) References Cited

U.S. PATENT DOCUMENTS

| | | |
|---|---|---|
| 9,829,338 B2 | 11/2017 | Ward |
| 10,154,316 B2 | 12/2018 | Zhao |
| 10,166,466 B2 | 1/2019 | Brav et al. |
| 10,216,272 B2 | 2/2019 | Keller et al. |
| 10,380,993 B1 | 8/2019 | Clauer Salyers |
| 10,423,214 B2 | 9/2019 | Mistry et al. |
| 10,444,834 B2 | 10/2019 | Vescovi et al. |
| 10,449,445 B2 | 10/2019 | Brav et al. |
| 10,574,879 B1 | 2/2020 | Prasad et al. |
| 11,134,524 B2* | 9/2021 | Flast .................. G06Q 20/321 |
| 11,605,271 B1* | 3/2023 | Ghosh .................. G08B 6/00 |
| 11,961,389 B2* | 4/2024 | Ghosh .................. G08B 6/00 |
| 2006/0024647 A1 | 2/2006 | Chesnais et al. |
| 2016/0134737 A1 | 5/2016 | Pulletikurty |
| 2016/0296839 A1 | 10/2016 | Brav et al. |
| 2017/0011602 A1 | 1/2017 | Brav et al. |
| 2019/0324536 A1 | 10/2019 | Forest et al. |
| 2019/0391645 A1 | 12/2019 | Vescovi et al. |
| 2020/0314346 A1* | 10/2020 | Mukul .................. G06V 30/414 |
| 2023/0215249 A1 | 7/2023 | Ghosh et al. |

OTHER PUBLICATIONS

"U.S. Appl. No. 17/247,145, Notice of Allowance mailed Nov. 9, 2022".

"U.S. Appl. No. 17/247,145, Response filed Sep. 6, 2022 to Non Final Office Action mailed Jun. 8, 2022", 10 pgs.

"U.S. Appl. No. 18/120,572, Non Final Office Action mailed Jul. 6, 2023", 7 pgs.

"U.S. Appl. No. 18/120,572, Notice of Allowance mailed Dec. 11, 2023", 7 pgs.

"U.S. Appl. No. 18/120,572, Response filed Oct. 6, 2023 to Non Final Office Action mailed Jul. 6, 2023", 7 pgs.

"McLear", [Online]. Retrieved from the Internet: <URL: https://mclear.com/>, (Accessed Oct. 5, 2020), 18 pgs.

"Motiv Ring", [Online]. Retrieved from the Internet: <URL: https://mymotiv.com/>, (Accessed Oct. 5, 2020), 6 pgs.

"NFC Ring", McLear Ltd., [Online]. Retrieved from the Internet: <URL: https://nfcring.com/>, (Accessed Oct. 5, 2020), 4 pgs.

"Oura", [Online]. Retrieved from the Internet: <URL: https://ouraring.com/>, (Accessed Oct. 5, 2020), 6 pgs.

"Token", [Online]. Retrieved from the Internet: <URL: https://tokenring.com/>, (Accessed Oct. 5, 2020), 6 pgs.

Ghiani, Giuseppe, et al., "(Abstract) Vibrotactile feedback to aid blind users of mobile guides", Journal of Visual Languages & Computing 20 (5) pp. 305-317, (2009), 2 pgs.

Meliones, Apostolos, et al., "Blind MuseumTourer: A system for self-guided tours in museums and blind indoor navigation", Technologies 6 (4), [Online]. Retrieved from the Internet: <URL: https://www.mdpi.com/2227-7080/6/1/4/pdf>, (2018), 1-31.

Satpute, Shantanu, "FingerSight: A Vibrotactile Wearable Ring to Help the Blind Locate and Reach Objects in Peripersonal Space", Thesis, University of Pittsburgh, [Online]. Retrieved from the Internet: <URL: http://d-scholarship.pitt.edu/36227/1/Satpute_April8_ETD.pdf>, (2019), 85 pgs.

Shoval, Shraga, et al., "Computerized obstacle avoidance systems for the blind and visually impaired", Intelligent systems and technologies in rehabilitation engineering, (2000), 25 pgs.

Zeng, L, et al., "HapticRein: Design and Development of an Interactive Haptic Rein for a Guidance Robot", International Conference on Computers Helping People with Special Needs, (2018), 14 pgs.

* cited by examiner

ENHANCED ACCESSIBILITY USING WEARABLE COMPUTING DEVICES

PRIORITY APPLICATIONS

This application is a continuation of U.S. patent application Ser. No. 18/120,572, filed Mar. 13, 2023, which is a continuation of U.S. patent application Ser. No. 17/247,145, filed Dec. 1, 2020, now issued as U.S. Pat. No. 11,605,271, the content of each by which are incorporated herein by reference in their entirety.

TECHNICAL FIELD

Embodiments pertain to wearable computing devices such as smart rings and smart watches. Some embodiments relate to using a wearable computing device to assist user in completing tasks. Some embodiments relate to enhancements to accessibility of smartphone applications using wearable computing devices.

BACKGROUND

Disabled individuals may have trouble accessing features of applications on mobile devices such as smartphones. For example, individuals with a sight impairment may have trouble seeing information displayed on the screen of the mobile device. In other examples, various input actions on smartphones are controlled and manipulated by users moving one or more hands, fingers, or other appendages. Individuals with a motor impairment may have difficulty providing these inputs.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
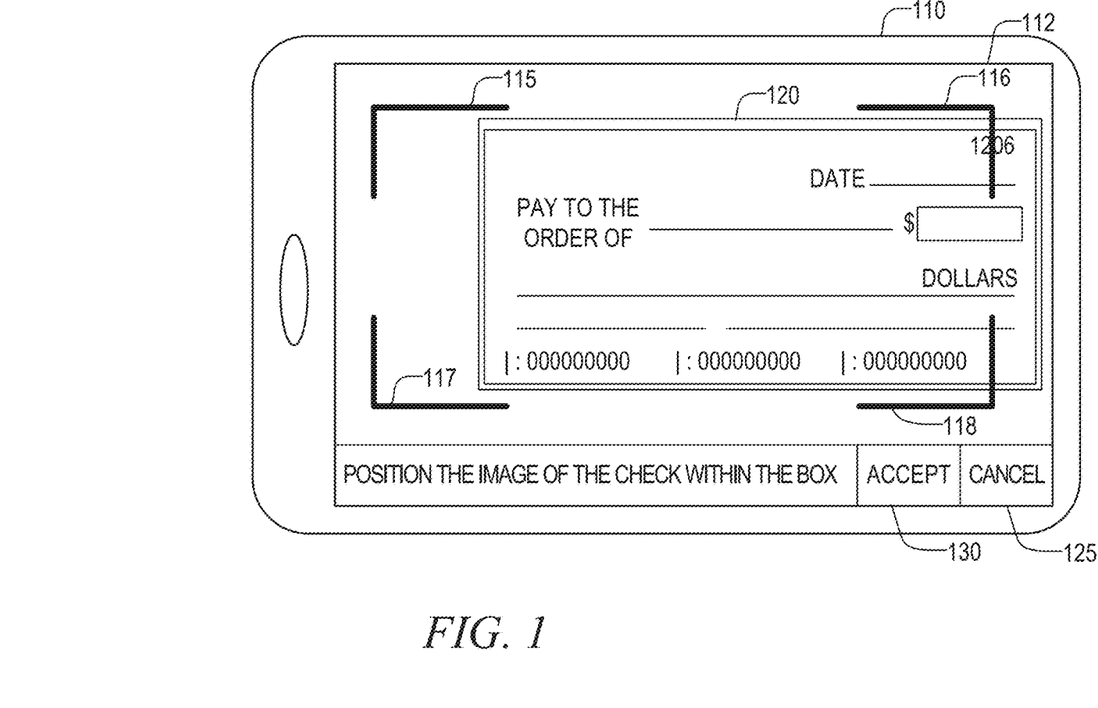
FIG. 1 shows an example of a remote check deposit operation according to some examples of the present disclosure.

As noted, disabled individuals may have trouble accessing features of applications on mobile devices such as smartphones. One specific example feature that may be difficult for users with disabilities may be correctly aligning a check for taking a picture for remote check deposit functionality. Users have to align the check such that the image of the check is within a bounding box on a screen of the mobile phone. FIG. 1 shows an example of a remote check deposit operation 100 according to some examples of the present disclosure. Mobile computing device 110 may have a screen 112 which may display an image 120 of a check 119 produced by a camera of the mobile computing device 110 (not shown). The user must move either the check 119 or the mobile computing device 110 so that the image 120, taken by the camera mounted to the mobile computing device 110 aligns within the bounding boxes 115, 116, 117, and 118 and then press the accept button 130 (which may be a physical button but also may be a touch-screen button). Cancel button 125 cancels the process (cancel button 125 may be a physical button but also may be a touch screen button).

For individuals who have visual or motor impairments this may be a difficult process. People who have vision impairments may have difficulty seeing the image 120 on the screen 112 or the bounding boxes 115, 116, 117, and 118. Additionally, people with motor impairments may have difficulty moving the check 119 or the mobile computing device 110.

Figure 2:
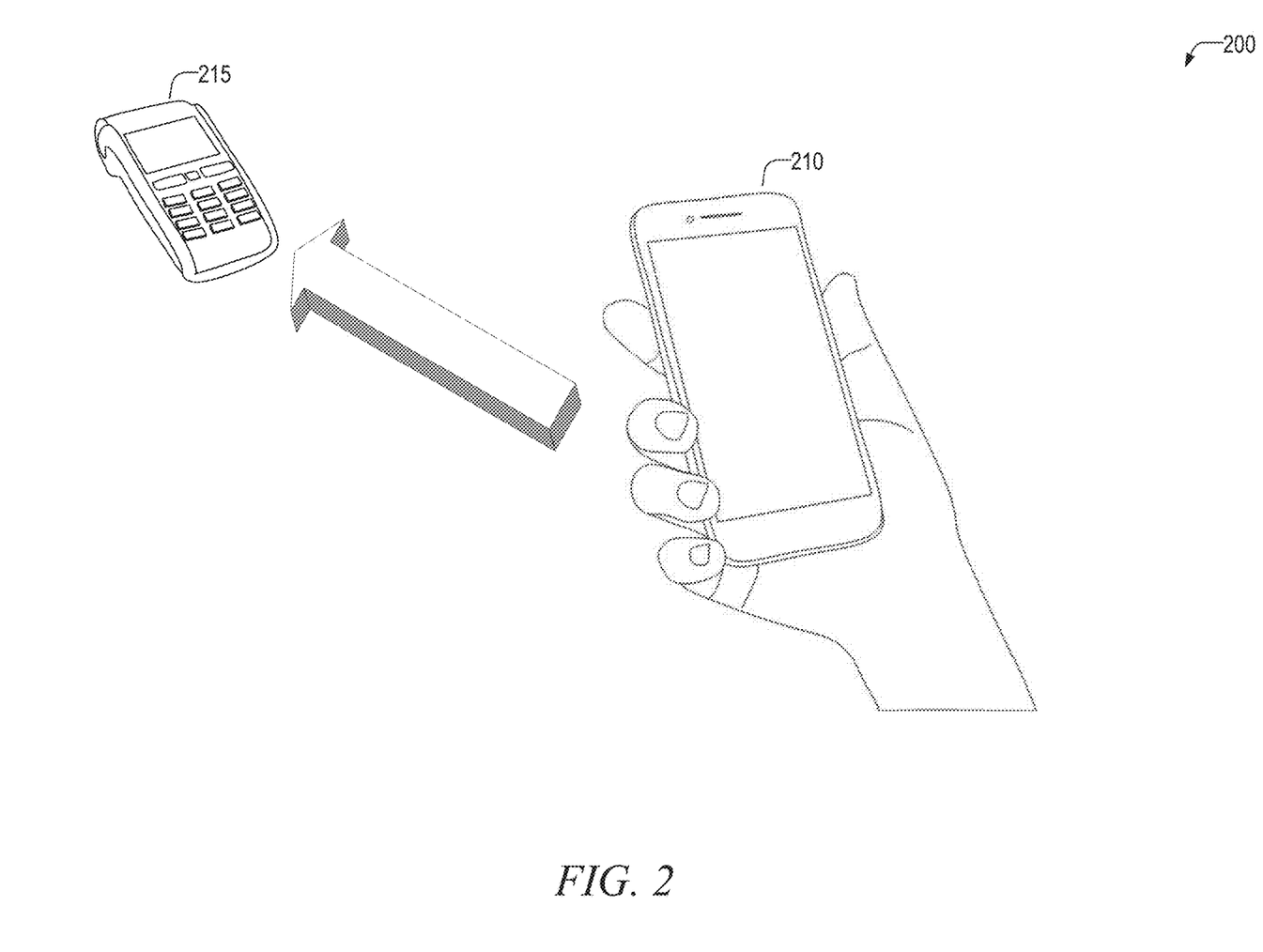
FIG. 2 illustrates an example of using a digital wallet application on a mobile computing device with a POS device according to some examples of the present disclosure.

Other example features of a mobile computing device that may be difficult for users to access may include features that require moving the mobile computing device towards or near a physical object. For example, using digital wallet features of a mobile computing device to make a payment. To use digital wallets to make a payment, a user typically taps their smartphone on a particular portion of a point of sale (POS) device or automated teller machine (ATM). FIG. 2 illustrates an example 200 of using a digital wallet application on a mobile computing device 210 with a POS device 215 according to some examples of the present disclosure. The user moves their mobile computing device 210 to be in close proximity to the POS device 215. The mobile computing device 210 and the POS device 215 then communicate using NFC technology to exchange payment information. Users with disabilities may have a hard time seeing where to place their smartphone or may have trouble moving their hand to that location. Other features involving moving the mobile computing device towards or near a physical object may include navigating their mobile device to an NFC reader that allows them access to one or more physical or electronic resources, such as opening a door lock, allowing access to computer files, and the like.

Other examples may include moving a physical object to the mobile computing device. Features may be accessible via one or more buttons of the mobile computing device. Users with disabilities may have problems accessing these buttons because they either cannot see these buttons or have motor difficulties preventing them from touching the buttons.

Disclosed in some examples are methods, systems, devices, and machine-readable mediums which utilize a wearable device, such as a smart ring, that provides tactile feedback to guide users in performing physical tasks. Tasks may include tasks associated with an application executing on a mobile device of the user. For example, in the remote check deposit scenario, the smartphone and the wearable may communicate to provide haptic feedback to the user through the wearable and/or the smartphone to assist the user in positioning the smartphone and/or the check so that the image of the check is within the bounding box. For example, the smart ring may vibrate in one or more ways to provide movement cues to the user. That is, a first haptic feedback pattern may instruct the user to move their phone (or the check) a first direction, a second haptic feedback pattern may instruct the user to move their phone (or the check) a second direction, and the like. Similarly, the haptic feedback may provide users spatial directions for completing a purchase by manipulating their mobile devices within range of an NFC reader on a POS device of a retailer. In other aspects, the haptic feedback may be used to assist users in finding menus, buttons, and other features of a mobile application.

A current spatial relationship between two objects (e.g., a smartphone and a check, a smartphone and an NFC reader, a user's finger and a button on the smartphone, and the like) may be established through one or more sensors on the wearable, the mobile computing device (e.g., smartphone), or both. For example, a sensor of the smartphone such as a camera along with image recognition techniques may be used to determine a position of the check with respect to the bounding box on the screen of the phone. The current spatial relationship may then be used to provide haptic feedback to a user through one or more wearables to achieve a desired spatial relationship. The current spatial relationship may be re-evaluated periodically to provide updated feedback.

Figure 3:
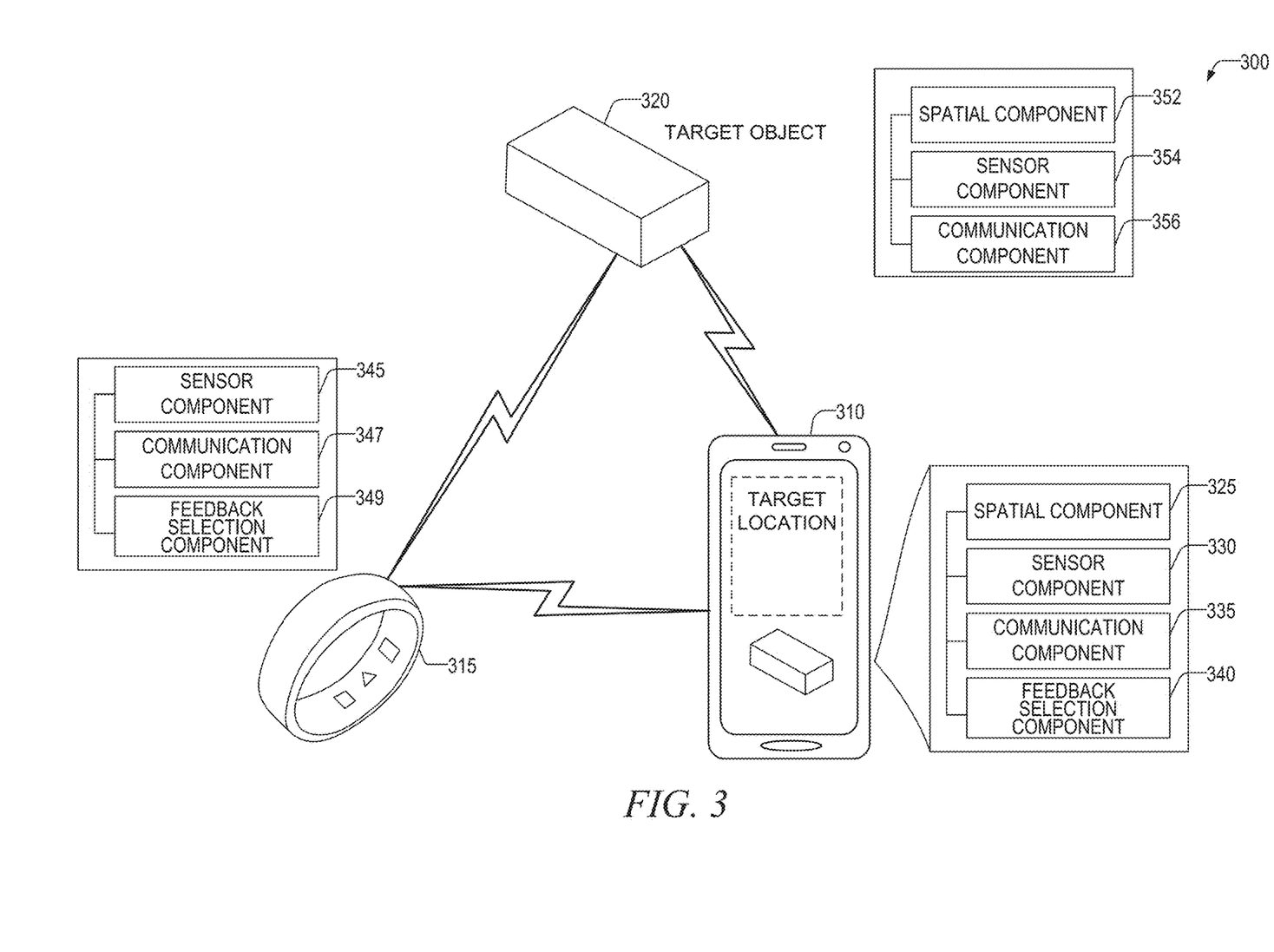
FIG. 3 illustrates a system for providing enhanced accessibility using wearable devices according to some examples of the present disclosure.

FIG. 3 illustrates a system 300 for providing enhanced accessibility using wearable devices according to some examples of the present disclosure. Wearable computing device 315, shown as a smart ring, may include one or more sensors in one or more locations, haptic feedback devices in one or more locations, a memory, a processor, a storage device, and the like. The wearable computing device 315 may execute instructions stored on the storage device. For example, the wearable computing device 315 may include one or more of the components of FIG. 6. Wearable computing device 315 is shown in FIG. 3 as a smart ring, but may take the form of a watch, a bracelet, an ankle bracelet, eyeglasses, belt mounted devices, head mounted devices, virtual reality devices, and the like.

Mobile computing device 310 may be in the form of a smartphone, laptop, or other computing device. Mobile computing devices may be contrasted with wearable computing devices in that mobile computing devices are intended to be portable, however, they are not designed to be worn on the body. Wearable computing devices are designed to be worn on the body. Mobile computing device 310, shown as a smartphone, may include one or more sensors in one or more locations, haptic feedback devices in one or more locations, a memory, a processor, a storage device, and the like. The mobile computing device 310 may execute instructions stored on the storage device. For example, the mobile computing device 310 may include one or more of the components of FIG. 6.

The target object 320 may be a computing device, or may not be a computing device. Example target objects 320 may include a POS device, a check, a finger of the user, a door, or other physical object. The system 300 may assist users with disabilities achieve tasks such as aligning the mobile computing device 310 in a desired orientation with respect to the target object 320 by providing feedback via haptic feedback on wearable computing device 315 and/or mobile computing device 310.

Mobile computing device 310 may include spatial component 325, sensor component 330, communication component 335, and feedback selection component 340. Sensor component 330 may interface with one or more sensors to provide sensor data to other applications and components. Example sensors include cameras (front and/or rear facing), IR cameras, accelerometers, navigation sensors (such as Global Navigation Satellite Systems (GNSS) sensors), gyroscopes, magnetometer, LiDAR, Soli sensors, barometer, proximity sensor, and the like. The output of one or more of these sensors may be used to determine an orientation of the mobile computing device 310 to the target object 320 by the spatial component 325. In some examples, the spatial orientation may be determined by an object detection and/or image classification algorithm that identifies a target object and determines a bounding box of the target object. For example, the algorithms may determine an orientation of a paper check (an example of target object 320) with respect to a lens of the mobile computing device 310. The spatial component 325 may determine a desired orientation of the object. The desired orientation may be determined based upon a goal of a user. For example, if the user is attempting to orient the image of the check in a box as shown in FIG. 1, then the desired orientation may be the box defined by 115, 116, 117, and 118. The spatial component 325 may then determine a movement direction based upon the differences between the spatial relationship between the first computing device and the object.

Based upon the movement direction, the feedback selection component 340 may select one or more haptic feedback schemes. A haptic feedback scheme specifies a location of one or more haptic modules providing feedback, an intensity of the feedback, and a pattern of the feedback. Haptic modules may be located within the mobile computing device 310, wearable computing device 315, or both. The location may be selected based upon feedback to bring the user closer to the desired orientation. For example, the location may be a location on a wearable, such as a haptic module on the right side of the wearable when the user needs to move the object to the right. The haptic modules to activate may be specified by a preset configuration or by the user.

The intensity may be static or may vary depending on whether the user is getting closer to or farther from the desired orientation of the mobile device with respect to the object. For example, as the user gets farther from the desired orientation the intensity may increase, or vice versa (which may be set based upon a user configuration).

In some examples, multiple haptic modules may provide the haptic feedback scheme across the modules. That is, both a first haptic module and a second haptic module provides feedback in combination. The haptic modules may be active at a same time or a different time with respect to each other in a pattern of activation. This may allow for complex directions to the user. For example, if a wearable has only two feedback modules, using both may allow the system to provide feedback along all three axes in three-dimensional space. Thus, an example feedback pattern may be:

| Desired movement direction | Haptic Module 1 | Haptic Module 2 |
| --- | --- | --- |
| Left | On-Continuous Activation | Off |
| Right | Off | On-Continuous Activation |
| Forward | On-Activation Pattern 1 | Off |
| Backward | Off | On-Activation Pattern 1 |
| Left and Forward | On-Continuous Activation | On-Continuous Activation |
| Left and Backward | On-Activation Pattern 1 | On-Activation Pattern 1 |

The chosen haptic feedback scheme may then be sent to one or more wearable computing devices such as wearable computing device 315. For example, using communication component 335. Communication component 335 may communicate with wearable computing device 315, and in some examples, target object 320 (in examples in which target object 320 is a computing device). Communications may be short or long-range wireless, such as Wireless Fidelity (Wifi), Bluetooth, NFC, and the like. Communications may be corded, such as through a Universal Serial Bus (USB) connection.

In some examples, in addition to, or instead of, using the sensors on the mobile computing device 310 to calculate the spatial orientation of the mobile computing device 310 to the target object 320, the spatial component 325 may use one or more sensors on the wearable computing device 315. For example, a sensor component 345 on the wearable may receive sensor data of sensors on the wearable computing device 315 and provide it to the mobile computing device 310 using communication component 347 of wearable computing device 315. The sensor data from the wearable computing device 315 may be received by the mobile computing device 310 using communication component 335. For example, the wearable computing device 315 may have a camera that may provide a second image that informs the spatial component 325 of the relationship between the mobile computing device 310 and the target object 320.

In some examples, the feedback selection component may be located on the wearable computing device 315. The feedback selection component 349 may function similarly to feedback selection component 340. In these examples, the movement direction may be sent to the wearable computing device 315 by the mobile computing device 310. The movement direction may then be used by the feedback selection component 349 to determine a haptic feedback pattern.

As noted, the process of determining a spatial orientation between the target object 320 and the mobile computing device 310 and providing haptic feedback to move the current spatial orientation between the target object 320 and the mobile computing device 310 to reach the goal orientation may be continuous or may occur at regular intervals until the goal orientation is reached.

In some examples, in order to determine the appropriate feedback selection, the feedback selection component 340 and/or 345 may determine a spatial orientation between the wearable computing device 315 and the mobile computing device 310 and/or the target object 320, for example, to determine whether a smart ring wearable computing device 315 is on the left or right hand. This may be accomplished through one or more sensors of either the wearable computing device 315 and/or the mobile computing device 310. In other examples, the spatial orientation of the wearable computing device 315 on a body of the user may be pre-configured through one or more settings of the system. That is, the user may specify where the wearable is worn on the user's body. In some examples, a prespecified feedback scheme is used—such as a lookup table whereby the movement direction indexes into the table to determine the feedback scheme.

While a single wearable computing device 315 is shown, in some examples, multiple wearable computing devices may be used in cooperation according to some examples. For example, if the user has two smart rings, one on each hand, haptic feedback may be delivered through one, or both of the devices. For example, to center the image of the check within the bounding boxes of FIG. 1, the ring on the user's right finger may vibrate to indicate to the user to move the phone to the right, and the ring on the user's left finger may vibrate to indicate to the user to move their phone to the left.

In some examples, the target object 320 may be a physical object, such as a finger of a user or a paper check. In yet other examples, the target object 320 may be a computing device such as a POS device, an NFC reader, an Automated Teller Machine, or the like. In examples in which the target object 320 is a computing device, the target object 320 may include a spatial component 352, sensor component 354, and communication component 356. Communication component 356 may communicate with communication components 347, and 335 using wired and/or wireless methods.

Sensor component 354 may collect sensor data from one or more sensors on the target object 320. Sensors may include any one or more of the sensors described with reference to the mobile computing device 310. This sensor data may be provided to the mobile computing device 310 and/or wearable computing device 315 to assist these devices in determining spatial orientations. In still other examples, the target object 320 may have a spatial component 352 that may calculate a spatial orientation between the target object and the mobile computing device 310 and/or the wearable computing device 315 that may be sent to the mobile computing device 310 and/or wearable computing device 315 to assist in selecting a haptic feedback pattern. In some examples, the system may use spatial orientation data calculated by one or more of target object 320, mobile computing device 310 and/or wearable computing device 315 alone or in combination to calculate the spatial orientation of the mobile computing device 310 with respect to the target object 320.

While functionality such as the spatial component 325, sensor component 330, communication component 335, and feedback selection component 340 was noted as being present on certain devices, one of ordinary skill in the art with the benefit of the present application will understand that the functionality of those components may be implemented on any of the computing devices in FIG. 3 or by other devices not shown (such as cloud-computing devices).

Figure 4:
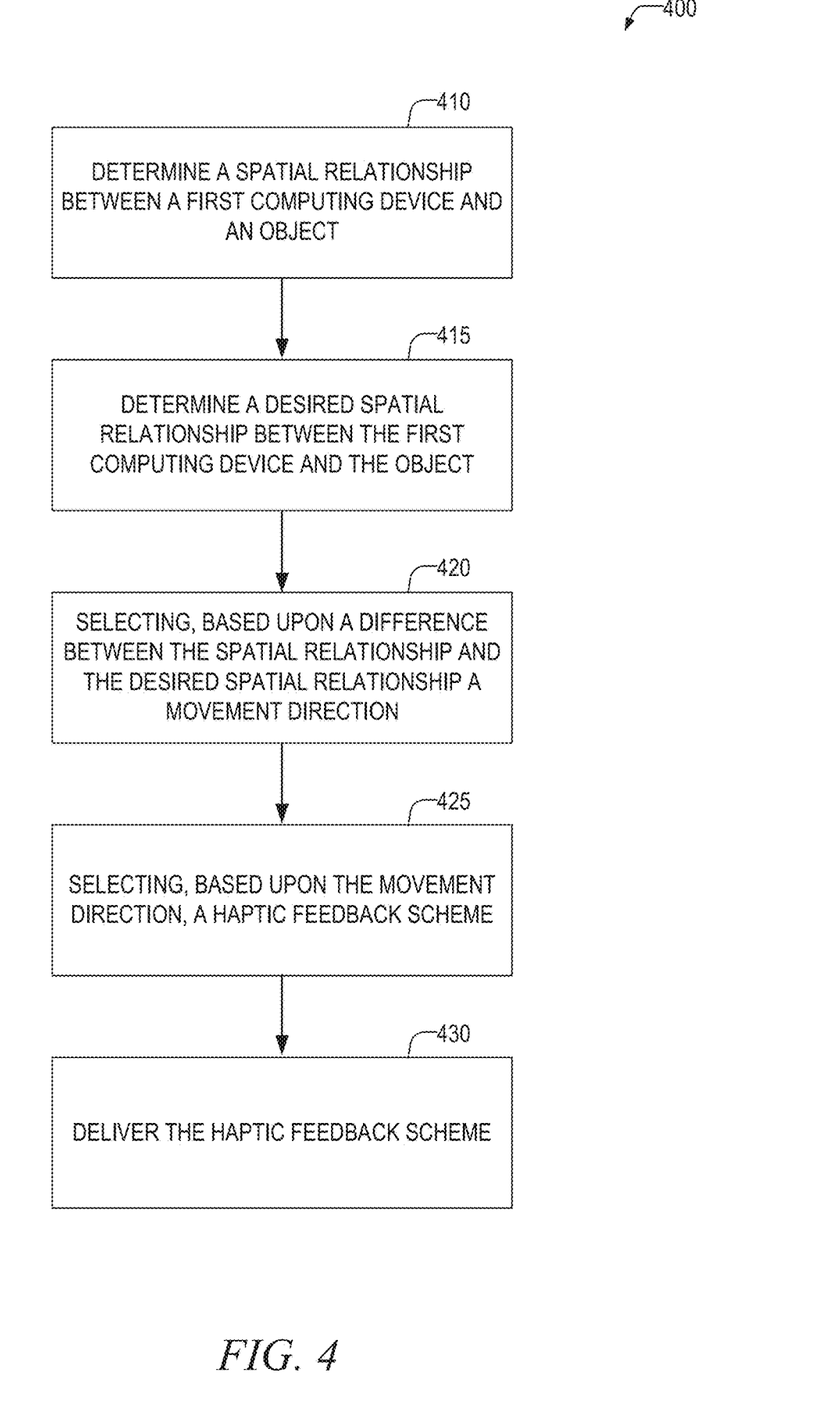
FIG. 4 illustrates a flow chart of a method of providing haptic feedback for a user to assist the user in completing a physical task according to some examples of the present disclosure.

FIG. 4 illustrates a flow chart of a method 400 of providing haptic feedback for a user to assist the user in completing a physical task according to some examples of the present disclosure. Example tasks may include tasks related to an application executing on a user's mobile computing device. One example application may include a banking or financial application. Tasks may include aligning a lens of a camera of a smartphone (e.g., by moving the smartphone) to an object (e.g., such as a check or financial document) to take pictures; aligning the smartphone within reach of a NFC communication device (e.g., such as at a POS device; a door lock device; another mobile computing device such as a smartphone; or the like); aligning the smartphone with another smartphone; aligning a user's finger over a screen of the smartphone to assist the user in pressing a button or otherwise engaging functionality of the smartphone; and the like.

At operation 410 the system may determine a spatial relationship between a first computing device and an object. The first computing device may be a mobile computing device of the user such as a smartphone. The object may be a finger of a user, an object to be photographed (such as a check), an NFC communication device, another mobile computing device, or another wearable computing device. The spatial relationship may be determined based upon sensor data of the first computing device, sensor data of the object (in examples in which the object is a computing device), sensor data of one or more wearable computing devices, one or more sensors in an environment of the user, or the like. A number of sensor outputs may be fused using a sensor fusion algorithm to produce an accurate view of the environment and the spatial positioning of objects. In some examples in which sensors are cameras, computer vision algorithms such as object detection and image segmentation algorithms may be used to determine the position of the object with respect to the computing device. Example algorithms may include a Region-Based Convolutional Neural Network (R-CNN), Fast R-CNN, Faster R-CNN, Region-Fully Convolutional Neural Network (R-FCN), Single Shot Multibox Detector, and the like. The camera sensors used may be forward or rear facing, depending on the object. For example, for a check, the rear facing camera may be used, but for a finger of a person, the forward-facing camera may capture an image of the user.

At operation 415, a desired spatial relationship between the first computing device and the object may be determined. For example, the object should appear within a bounding box on a screen of the device. In other examples, for assisting the user with placing their finger on a button or other feature of an application of the mobile computing device, the desired spatial relationship may be the finger on the button. For examples in which the assistance is helping the user navigate their mobile computing device toward an NFC communication device, the desired spatial relationship is one that is near enough the NFC communication device to establish a wireless NFC connection. The desired spatial relationship may be pre-specified—e.g., by an administrator or developer of the system. In other examples, the desired spatial relationship may be learned through machine learning techniques that are trained with a model of the desired spatial relationship.

At operation 420, the current spatial relationship determined at operation 410 and the desired spatial relationship at operation 415 may be compared and a movement direction may be selected that, if accomplished, would move the current spatial representation closer to a desired spatial representation. Pathfinding algorithms such as A*, D* and D* lite may be used to determine a path between the current spatial relationship and the desired spatial relationship.

At operation 425, the system may select a haptic feedback scheme based upon the movement direction at operation 420. In some examples, simple feedback may be provided such that if the direction is to move to the right, a feedback scheme urging the user to move the object or the mobile computing device to the right may be provided. For example, by activating a haptic module on a right side of a wearable (e.g., a smart ring). In other examples, the haptic feedback may provide a virtual "fence" such that movements away from the desired orientation cause stimulation. For example, if a movement to the right is indicated, but the user moves left, a haptic module on a left of the wearable may activate. Once the user starts moving back rightwards, the haptic module stops activating. If the user moves too far to the right, a haptic module on the right of the wearable may activate. Thus, by using vibration, the boundaries of the desired orientation may be communicated to a user.

In some examples, if the spatial relationship at operation 410 is closer to the desired spatial relationship calculated in operation 415 than a preceding calculated spatial relationship (e.g., the user is moving towards the desired spatial relationship), then a feedback scheme may change or feedback may not be provided. In some examples, an intensity of the haptic feedback may be varied based upon how far away from the desired orientation the user is with greater intensity feedback the farther the user is away from the desired orientation. While the above examples utilized multiple haptic modules, embodiments with a single module may be used but with different haptic feedback patterns or intensities to signify different directional instructions.

In other examples, and as already mentioned, more than one haptic module may be activated to provide feedback. For example, the movement direction produced by operation 420 may be a vector specifying a movement direction for either the mobile computing device or the object towards the desired orientation. In some examples, the vector may have x, y, and z components in a three-dimensional space. Haptic modules on one or more wearable(s) may be mapped to a particular direction in each dimension. For example:

| Haptic module | Mapping |
|---|---|
| 1 | Positive X direction |
| 2 | Negative X direction |
| 3 | Positive Y direction |
| 4 | Negative Y direction |
| 5 | Positive Z direction |
| 6 | Negative Z direction |

For a vector of <1, −1, 7>, the haptic modules 1, 4, and 5 would be activated. The haptic module 5 would be activated at a higher intensity (e.g., the vector quantity may correspond to an intensity of activation). In other examples, rather than different modules, the different modules may be different activation patterns of a same one or more haptic modules. This allows using the system with fewer than 6 modules.

At operation 430, the selected haptic feedback pattern may be delivered to the user. For example, by causing one or more haptic modules to activate. That is, the mobile computing device may activate one or more of its haptic modules or request that a wearable device activate one or more of its haptic modules. For example, the mobile computing device and the wearable computing device may be connected through one or more wired and/or wireless methods.

In some examples, the haptic modules may be on one or more wearables. In other examples, the mobile computing device of the user may also have one or more haptic modules and those may be used instead of, or in addition to those of the wearables. In other examples, in addition to, or instead of haptic feedback, other feedback may be provided, such as audio feedback, visual feedback, and the like. The selection of feedback types may be configured by the user so as to work with the user's disability. Thus, if a user has trouble seeing, audio and/or haptic feedback may be used. If the user has trouble hearing, visual feedback and/or haptic feedback may be used. Where other feedback methods are used, the operations of FIG. 4 and the previously described features are still applicable.

As noted, a Region-Based Convolutional Neural Network (R-CNN) or similar algorithms may be used to determine objects in video feeds to determine spatial relationships. R-CNN is described by Rich Feature Hierarchies for Accurate Object Detection and Semantic Segmentation by Girshick, R., Donahue, J., Darrell, T., & Malik, J., Proceedings of the IEEE Conference on Computer Vision and Pattern Recognition (2014). The R-CNN technique may first generate and extract candidate bounding boxes from the input image using a selective search mechanism. The R-CNN then submits each region of interest to a feature extractor, such as an AlexNet deep Convolutional Neural Network (CNN) or a Scale Invariant Feature Transform (SIFT), to extract features from the candidate bounding boxes. Finally, a classifier, such as a linear support vector machine (SVM) may be used to classify the features as one or more shapes. A different SVM may be trained to detect the various possible objects. Other similar algorithms may be used, such as Fast R-CNN. Fast R-CNN may run the feature recognition neural network once on the whole image, rather than on each region of interest. Fast R-CNN then uses ROIPooling to slice out each region of interest from the output and classifies it. In other examples, Faster R-CNN may be used as described by Faster R-CNN: Towards Real-Time Object Detection with Region Proposal Networks by Shaoqing Ren, Kaiming He, Ross Girshick, and Jian Sun, IEEE Transactions on Pattern Analysis and Machine Intelligence (Volume: 39, Issue: 6, Jun. 1, 2017) which integrates region of interest generation into the neural network itself. In still other examples, the system may utilize a Region-Fully Convolutional Neural Network (R-FCN) as described by the paper R-FCN: Object Detection via Region-based Fully Convolutional Networks by Jifeng Dai, Yi Li, Kaiming He, and Jian Sun, 30th Conference on Neural Information Processing Systems (NIPS 2016), Barcelona, Spain.

Instead of, or in addition to the R-CNN methods, the system may utilize a Single Shot Multibox Detector, described by Liu W. et al. (2016) SSD: Single Shot MultiBox Detector. In: Leibe B., Matas J., Sebe N., Welling M. (eds) Computer Vision—ECCV 2016. ECCV 2016. Lecture Notes in Computer Science, vol 9905. Springer, Cham. The SSD utilizes a VGG-16 neural network (a convolutional neural network model proposed by K. Simonyan and A. Zisserman from the University of Oxford in the paper "Very Deep Convolutional Networks for Large-Scale Image Recognition") architecture that replaces the fully connected layers with a set of auxiliary convolutional layers (from conv6 onwards) to enable feature extraction at multiple scales. The SSD is trained with ground truth bounding boxes and assigned class labels for each possible object.

In some examples, a machine learning algorithm may utilize sensor data as input and output the orientation at operation 410. In some examples a machine learning algorithm may utilize the image recognition and segmentation algorithms above with additional input of the desired spatial relationship along with additional layers to output the movement direction at operation 425. Thus, operations 410 and 420 may both be performed by a same machine learning model. As noted above, in some examples, the system may use image data from sensors, but other sensors may be used as well. These sensor outputs may also be input to the machine learning algorithm.

Figure 5:
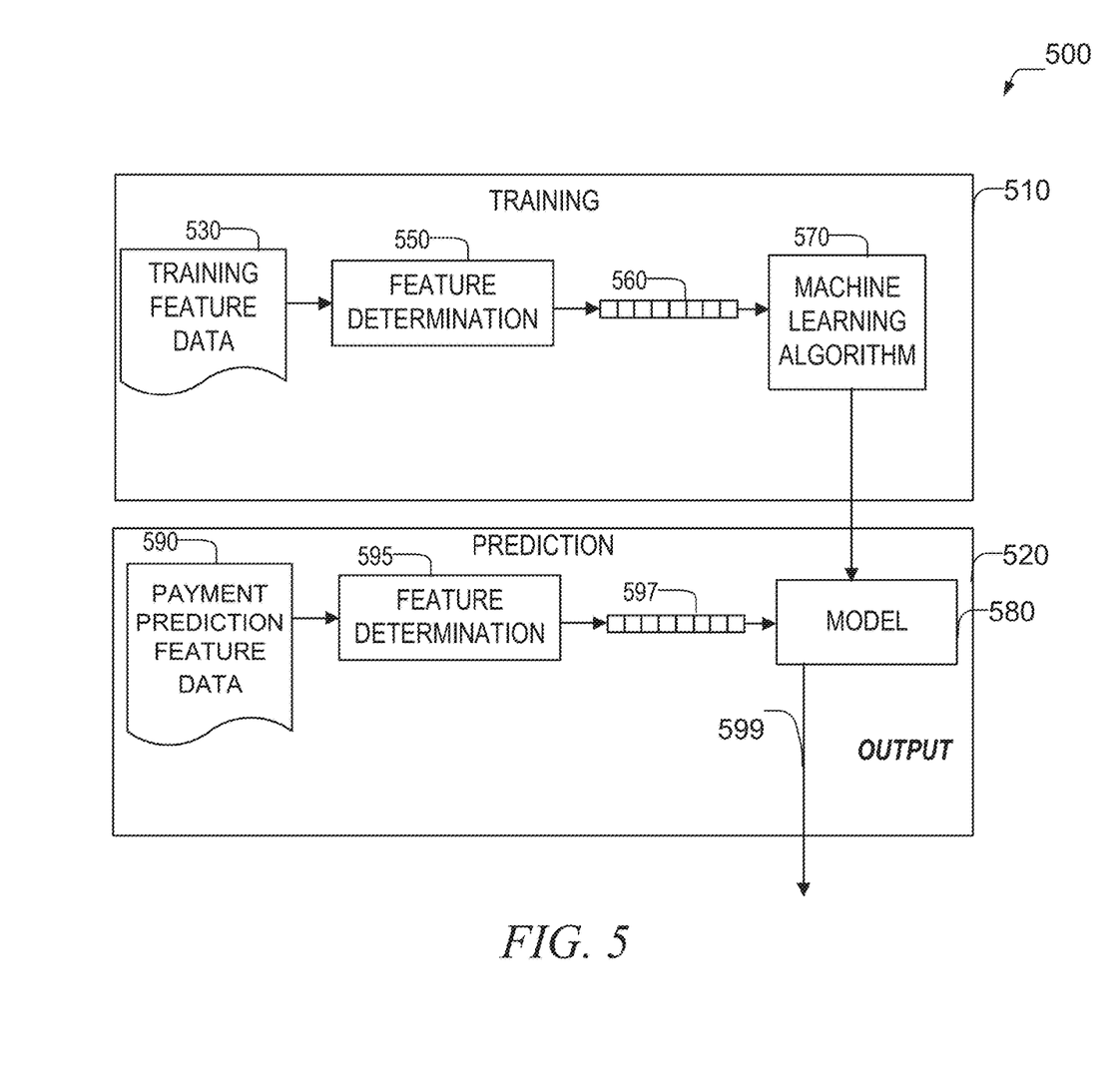
FIG. 5 shows an example machine learning module according to some examples of the present disclosure.

FIG. 5 shows an example machine learning module 500 according to some examples of the present disclosure. The machine learning module 500 may be implemented in whole or in part by one or more computing devices. In some examples, the training module 510 may be implemented by a different device than the prediction module 520. In these examples, the model 580 may be created on a first machine and then sent to a second machine. For example, one or more of the training module 510 and/or prediction module 520 may be implemented on the mobile computing device 310, wearable computing device 315, target object 320, or another computing device.

Machine learning module 500 utilizes a training module 510 and a prediction module 520. Training module 510 inputs training data 530 into selector module 550. In some examples, the training data 530 may include sensor data, such as one or more images. For example, if the data set is a graphics interchange format (GIF) or Bitmap image, the data set itself may be converted into a format compatible with the training module. The training data 530 may be labeled with the object and its location within the image and/or the spatial orientation of the object.

Selector module 550 converts and/or selects training vector 560 from the training data 530. For example, the selector module 550 may filter, select, or otherwise convert the training data. For example, the selector module 550 may apply one or more feature selection algorithms to find features in the training data. The selected data may fill training vector 560 and comprises a set of the training data that is determined to be predictive of an orientation. Information chosen for inclusion in the training vector 560 may be all the training data 530 or in some examples, may be a subset of all the training data 530. The training vector 560 may be utilized (along with any applicable labels) by the machine learning algorithm 570 to produce a model 580. In some examples, other data structures other than vectors may be used. The machine learning algorithm 570 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected.

In the prediction module 520, sensor data 590 may be input to the selector module 595. Selector module 595 may operate the same, or differently than selector module 550. In some examples, selector modules 550 and 595 are the same modules or different instances of the same module. Selector module 595 produces vector 597, which is input into the model 580 to produce an output 599 such as a segmentation (identification of an object along with a location within an image) or a representation of a spatial relationship. For example, the weightings and/or network structure learned by the training module 510 may be executed on the vector 597 by applying vector 597 to a first layer of the model 580 to produce inputs to a second layer of the model 580, and so on until the encoding is output. As previously noted, other data structures may be used other than a vector (e.g., a matrix).

The training module 510 may operate in an offline manner to train the model 580. The prediction module 520, however, may be designed to operate in an online manner. It should be noted that the model 580 may be periodically updated via additional training and/or user feedback. The machine learning algorithm 570 may be selected from among many different potential supervised or unsupervised machine learning algorithms. Examples of learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, a region based CNN, a full CNN (for semantic segmentation), a mask R-CNN algorithm for instance segmentation, and hidden Markov models. Examples of unsupervised learning algorithms include expectation-maximization algorithms, vector quantization, and information bottleneck method.

Figure 6:
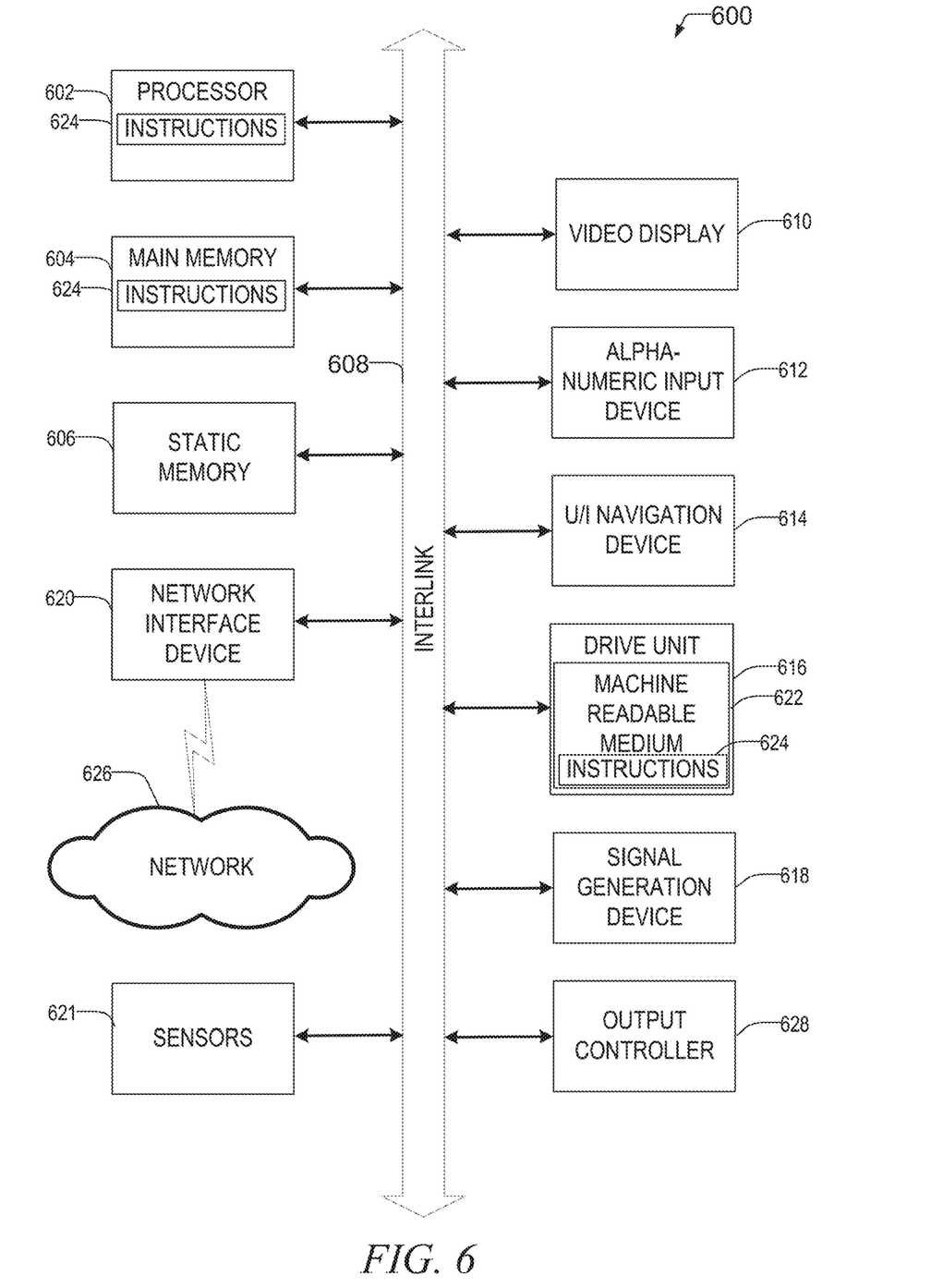
FIG. 6 is a block diagram illustrating an example of a machine upon which one or more embodiments may be implemented according to some examples of the present disclosure.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a mobile computing device (such as a smartphone; a mobile telephone, a personal digital assistant, a tablet), a wearable computing device, an object (e.g., target object 320), personal computer (PC), a set-top box (STB), a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. In some examples, the machine 600 may be an example of mobile computing device 110, mobile computing device 210, POS device 215, may implement any of the modules shown in FIG. 3 (e.g., may be the mobile computing device 310, wearable computing device 315, target object 320), implement the method 400, and/or implement the training and/or prediction modules 510 and 520.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620. The Machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

Other Notes and Examples

Example 1 is a method of providing haptic feedback for a user to assist the user in completing a physical task, the method comprising: determining a spatial relationship between a computing device and an object using at least one sensor on the computing device; determining a desired spatial relationship between the computing device and the object; selecting, based upon a difference between the spatial relationship and the desired spatial relationship, a movement direction from the spatial relationship towards the direction of the desired spatial relationship; selecting, based upon the movement direction, a haptic feedback scheme; and causing the haptic feedback scheme to be delivered to the user through a wearable computing device of a user.

In Example 2, the subject matter of Example 1 optionally includes wherein the sensor is a camera, and wherein the spatial relationship between the computing device and the object is a spatial relationship between a financial document and a lens of a camera of the computing device.

In Example 3, the subject matter of Example 2 optionally includes wherein the financial document is a check and wherein selecting the haptic feedback scheme comprises selecting a haptic feedback scheme associated with alignment of a check within a bounding box on a screen of the computing device.

In Example 4, the subject matter of any one or more of Examples 1-3 optionally include wherein the spatial relationship between the computing device and the object is a spatial relationship between a near field communication (NFC) reader and the computing device.

In Example 5, the subject matter of Example 4 optionally includes wherein selecting the haptic feedback scheme comprises selecting a haptic feedback scheme associated with alignment of the NFC reader and the computing device.

In Example 6, the subject matter of any one or more of Examples 1-5 optionally include wherein determining the spatial relationship between the computing device and the object using at least one sensor on the computing device comprises using a camera of the computing device and an object detection and identification algorithm to identify and detect the object.

In Example 7, the subject matter of any one or more of Examples 1-6 optionally include wherein the haptic feedback scheme comprises one or more of a location of haptic feedback, an intensity of the haptic feedback, or a pattern of delivery of the haptic feedback.

Example 8 is a computing device for providing haptic feedback for a user to assist the user in completing a physical task, the device comprising: a processor; a memory, the memory comprising instructions, which when executed by the processor, cause the computing device to perform operations comprising: determining a spatial relationship between the computing device and an object using at least one sensor on the computing device; determining a desired spatial relationship between the computing device and the object; selecting, based upon a difference between the spatial relationship and the desired spatial relationship, a movement direction from the spatial relationship towards the direction of the desired spatial relationship; selecting, based upon the movement direction, a haptic feedback scheme; and causing the haptic feedback scheme to be delivered to the user through a wearable computing device of a user.

In Example 9, the subject matter of Example 8 optionally includes wherein the sensor is a camera, and wherein the spatial relationship between the computing device and the object is a spatial relationship between a financial document and a lens of a camera of the computing device.

In Example 10, the subject matter of Example 9 optionally includes wherein the financial document is a check and wherein the operations of selecting the haptic feedback scheme comprises selecting a haptic feedback scheme associated with alignment of a check within a bounding box on a screen of the computing device.

In Example 11, the subject matter of any one or more of Examples 8-10 optionally include wherein the spatial relationship between the computing device and the object is a spatial relationship between a near field communication (NFC) reader and the computing device.

In Example 12, the subject matter of Example 11 optionally includes wherein the operations of selecting the haptic feedback scheme comprises selecting a haptic feedback scheme associated with alignment of the NFC reader and the computing device.

In Example 13, the subject matter of any one or more of Examples 8-12 optionally include wherein the operations of determining the spatial relationship between the computing device and the object using at least one sensor on the computing device comprises using a camera of the computing device and an object detection and identification algorithm to identify and detect the object.

In Example 14, the subject matter of any one or more of Examples 8-13 optionally include wherein the haptic feedback scheme comprises one or more of a location of haptic feedback, an intensity of the haptic feedback, or a pattern of delivery of the haptic feedback.

Example 15 is a non-transitory computer-readable medium, storing instructions for providing haptic feedback for a user to assist the user in completing a physical task, the instructions, when executed by a computing device, cause the computing device to perform comprising: determining a spatial relationship between a computing device and an object using at least one sensor on the computing device; determining a desired spatial relationship between the computing device and the object; selecting, based upon a difference between the spatial relationship and the desired spatial relationship, a movement direction from the spatial relationship towards the direction of the desired spatial relationship; selecting, based upon the movement direction, a haptic feedback scheme; and causing the haptic feedback scheme to be delivered to the user through a wearable computing device of a user.

In Example 16, the subject matter of Example 15 optionally includes wherein the sensor is a camera, and wherein the spatial relationship between the computing device and the object is a spatial relationship between a financial document and a lens of a camera of the computing device.

In Example 17, the subject matter of Example 16 optionally includes wherein the financial document is a check and wherein the operations of selecting the haptic feedback scheme comprises selecting a haptic feedback scheme associated with alignment of a check within a bounding box on a screen of the computing device.

In Example 18, the subject matter of any one or more of Examples 15-17 optionally include wherein the spatial relationship between the computing device and the object is a spatial relationship between a near field communication (NFC) reader and the computing device.

In Example 19, the subject matter of Example 18 optionally includes wherein the operations of selecting the haptic feedback scheme comprises selecting a haptic feedback scheme associated with alignment of the NFC reader and the computing device.

In Example 20, the subject matter of any one or more of Examples 15-19 optionally include wherein the operations of determining the spatial relationship between the computing device and the object using at least one sensor on the computing device comprises using a camera of the computing device and an object detection and identification algorithm to identify and detect the object.

In Example 21, the subject matter of any one or more of Examples 15-20 optionally include wherein the haptic feedback scheme comprises one or more of a location of haptic feedback, an intensity of the haptic feedback, or a pattern of delivery of the haptic feedback.

Example 22 is a computing device for providing haptic feedback for a user to assist the user in completing a physical task, the computing device comprising: means for determining a spatial relationship between a computing device and an object using at least one sensor on the computing device; means for determining a desired spatial relationship between the computing device and the object; means for selecting, based upon a difference between the spatial relationship and the desired spatial relationship, a movement direction from the spatial relationship towards the direction of the desired spatial relationship; means for selecting, based upon the movement direction, a haptic feedback scheme; and means for causing the haptic feedback scheme to be delivered to the user through a wearable computing device of a user.

In Example 23, the subject matter of Example 22 optionally includes wherein the sensor is a camera, and wherein the spatial relationship between the computing device and the object is a spatial relationship between a financial document and a lens of a camera of the computing device.

In Example 24, the subject matter of Example 23 optionally includes wherein the financial document is a check and wherein the means for selecting the haptic feedback scheme comprises means for selecting a haptic feedback scheme associated with alignment of a check within a bounding box on a screen of the computing device.

In Example 25, the subject matter of any one or more of Examples 23-24 optionally include wherein the spatial relationship between the computing device and the object is a spatial relationship between a near field communication (NFC) reader and the computing device.

In Example 26, the subject matter of Example 25 optionally includes wherein the means for selecting the haptic feedback scheme comprises means for selecting a haptic feedback scheme associated with alignment of the NFC reader and the computing device.

In Example 27, the subject matter of any one or more of Examples 22-26 optionally include wherein the means for determining the spatial relationship between the computing device and the object using at least one sensor on the computing device comprises means for using a camera of the computing device and an object detection and identification algorithm to identify and detect the object.

In Example 28, the subject matter of any one or more of Examples 22-27 optionally include wherein the haptic feedback scheme comprises one or more of a location of haptic feedback, an intensity of the haptic feedback, or a pattern of delivery of the haptic feedback.

What is claimed is:

1. A method for improving accessibility of a mobile application using a wearable device, the method comprising:
    at a first computing device:
    determining a spatial relationship between the first computing device and a wearable computing device;
    determining a desired spatial relationship between the first computing device and the wearable computing device, the desired spatial relationship based upon a location of a feature of an application executing on the first computing device;
    determining a movement direction, based upon a comparison between the spatial relationship and the desired spatial relationship, to move the wearable computing device towards the feature of the application executing on the first computing device;
    select a haptic feedback scheme based upon the movement direction; and
    causing the haptic feedback scheme to be delivered to a user through the wearable computing device.

2. The method of claim 1, wherein the wearable computing device is a smart ring, and wherein the haptic feedback scheme includes varying patterns of vibration to guide a finger of the user towards the feature of the application.

3. The method of claim 1, wherein the first computing device is a smartphone, and the feature of the application is a button on a touch screen of the smartphone, the method further comprising using a camera of the smartphone to determine the spatial relationship between the smartphone and the wearable computing device.

4. The method of claim 1, wherein the determining of the spatial relationship includes utilizing a sensor fusion algorithm that combines data from multiple sensors including at least an accelerometer and a gyroscope within the wearable computing device.

5. The method of claim 1, wherein the haptic feedback scheme includes a sequence of haptic signals that correspond to directional cues, guiding the user through a series of movements to navigate within the application executing on the first computing device.

6. The method of claim 1, wherein the haptic feedback scheme further comprises haptic intensity cues, which varies an intensity of the haptic feedback according to a proximity of the wearable computing device to the feature of the application.

7. The method of claim 1, wherein the application executing on the first computing device is a digital wallet application, and the feature of the application is a payment confirmation button.

8. A computing device comprising:
    a processor;
    a memory, storing instructions which when performed by the processor, cause the processor to perform operations comprising:
    determining a spatial relationship between the computing device and a wearable computing device;
    determining a desired spatial relationship between the computing device and the wearable computing device, the desired spatial relationship based upon a location of a feature of an application executing on the computing device;

determining a movement direction, based upon a comparison between the spatial relationship and the desired spatial relationship, to move the wearable computing device towards the feature of the application executing on the computing device;

select a haptic feedback scheme based upon the movement direction; and causing the haptic feedback scheme to be delivered to a user through the wearable computing device.

9. The computing device of claim 8, wherein the wearable computing device is a smart ring, and wherein the haptic feedback scheme includes varying patterns of vibration to guide a finger of the user towards the feature of the application.

10. The computing device of claim 8, wherein the computing device is a smartphone, and the feature of the application is a button on a touch screen of the smartphone, and wherein the operations further comprise using a camera of the smartphone to determine the spatial relationship between the smartphone and the wearable computing device.

11. The computing device of claim 8, wherein the operations of determining the spatial relationship includes utilizing a sensor fusion algorithm that combines data from multiple sensors including at least an accelerometer and a gyroscope within the wearable computing device.

12. The computing device of claim 8, wherein the haptic feedback scheme includes a sequence of haptic signals that correspond to directional cues, guiding the user through a series of movements to navigate within the application executing on the computing device.

13. The computing device of claim 8, wherein the haptic feedback scheme further comprises haptic intensity cues, which varies an intensity of the haptic feedback according to a proximity of the wearable computing device to the feature of the application.

14. The computing device of claim 8, wherein the application executing on the computing device is a digital wallet application, and the feature of the application is a payment confirmation button.

15. A non-transitory machine-readable medium, storing instructions, which when executed by a computing device, cause the computing device to perform operations comprising:

determining a spatial relationship between the computing device and a wearable computing device;

determining a desired spatial relationship between the computing device and the wearable computing device, the desired spatial relationship based upon a location of a feature of an application executing on the computing device;

determining a movement direction, based upon a comparison between the spatial relationship and the desired spatial relationship, to move the wearable computing device towards the feature of the application executing on the first computing device;

select a haptic feedback scheme based upon the movement direction; and causing the haptic feedback scheme to be delivered to a user through the wearable computing device.

16. The non-transitory machine-readable medium of claim 15, wherein the wearable computing device is a smart ring, and wherein the haptic feedback scheme includes varying patterns of vibration to guide a finger of the user towards the feature of the application.

17. The non-transitory machine-readable medium of claim 15, wherein the computing device is a smartphone, and the feature of the application is a button on a touch screen of the smartphone, and wherein the operations further comprise using a camera of the smartphone to determine the spatial relationship between the smartphone and the wearable computing device.

18. The non-transitory machine-readable medium of claim 15, wherein the determining of the spatial relationship includes utilizing a sensor fusion algorithm that combines data from multiple sensors including at least an accelerometer and a gyroscope within the wearable computing device.

19. The non-transitory machine-readable medium of claim 15, wherein the haptic feedback scheme includes a sequence of haptic signals that correspond to directional cues, guiding the user through a series of movements to navigate within the application executing on the machine.

20. The non-transitory machine-readable medium of claim 15, wherein the haptic feedback scheme further comprises haptic intensity cues, which varies an intensity of the haptic feedback according to a proximity of the wearable computing device to the feature of the application.

* * * * *